(12) United States Patent
Benedict

(10) Patent No.: US 7,990,117 B2
(45) Date of Patent: Aug. 2, 2011

(54) LOW-LOSS CONTROL OF DC-DC CONVERTERS IN AN ENERGY STORAGE SYSTEM

(75) Inventor: Eric L. Benedict, Middlesex, VT (US)

(73) Assignee: Northern Power Systems, Inc., Barre, VT (US)

( * ) Notice: Subject to any disclaimer, the term of this patent is extended or adjusted under 35 U.S.C. 154(b) by 492 days.

(21) Appl. No.: 12/168,355

(22) Filed: Jul. 7, 2008

(65) Prior Publication Data
US 2009/0033304 A1 Feb. 5, 2009

Related U.S. Application Data

(60) Provisional application No. 60/948,337, filed on Jul. 6, 2007.

(51) Int. Cl.
*G05F 1/40* (2006.01)
(52) U.S. Cl. .......................................... 323/271
(58) Field of Classification Search .......... 323/222–226, 323/268, 271, 282
See application file for complete search history.

(56) References Cited

U.S. PATENT DOCUMENTS

| | | | |
|---|---|---|---|
| 4,634,943 A | 1/1987 | Reick et al. | |
| 4,736,151 A | 4/1988 | Dishner | |
| 5,694,302 A | 12/1997 | Faulk | |
| 5,734,258 A | 3/1998 | Esser | |
| 6,166,527 A | 12/2000 | Dwelley et al. | |
| 6,243,277 B1 | 6/2001 | Sun et al. | |
| 6,897,641 B1 | 5/2005 | Herbert | |
| 6,984,967 B2 | 1/2006 | Notman | |
| 7,129,680 B2 * | 10/2006 | Higashitani et al. | 323/224 |
| 7,333,349 B2 * | 2/2008 | Chang et al. | 363/17 |
| 7,652,453 B2 * | 1/2010 | Iulian | 323/259 |
| 2001/0054887 A1 | 12/2001 | Baretich et al. | |
| 2004/0100149 A1 | 5/2004 | Lai | |
| 2004/0207373 A1 | 10/2004 | Muller et al. | |
| 2005/0146310 A1 | 7/2005 | Orr | |
| 2005/0225177 A1 | 10/2005 | Jacobs et al. | |

* cited by examiner

*Primary Examiner* — Matthew V Nguyen
(74) *Attorney, Agent, or Firm* — Downs Rachlin Martin PLLC (57) ABSTRACT

An energy storage system including a buck-boost DC-DC converter operable so as to minimize switching loses. The system includes a first energy storage device, e.g., a bank of ultracapacitors, and a second energy storage device, e.g., a second bank of electrolytic capacitors. Both first and second energy storage devices are connected to the DC-DC converter. The DC-DC converter is operated in a non-standard manner so as to reduce switching and other losses. In particular, the DC-DC converter may be operated in an alternate buck mode so as to force on a switch S2 through which energy flows from the first energy storage device to the second energy storage device. The switch S2 is forced on for so long as the voltage on the second energy storage device remains within a first operating window.

18 Claims, 6 Drawing Sheets

LOW-LOSS CONTROL OF DC-DC CONVERTERS IN AN ENERGY STORAGE SYSTEM

RELATED APPLICATION DATA

This application claims priority on U.S. Provisional Patent Application Ser. No. 60/948,337, filed Jul. 6, 2007, which is incorporated herein by reference in its entirety.

FIELD OF THE INVENTION

The present invention generally relates to the field of energy storage systems. In particular, the present invention is directed to a low-loss control of DC-DC converters in an energy storage system.

BACKGROUND OF THE INVENTION

Energy storage systems often include, among other things, semiconductor devices. Switching operations of these semiconductor devices perform non-instantaneous transitions of the voltage and current resulting in switching losses in the semiconductor devices and formation of ripple currents.

Certain energy storage systems include power converters that operable in buck and boost modes in connection with the charging and discharging of energy storage devices used in the system. Due to the switching nature of such converters in the energy storage systems, the current flowing through an inductor and consequently a capacitor used as an energy storage device in the system will increase or decrease based on the present switching state of the semiconductor devices included in the system to form a ripple current. The ripple current introduces additional losses in the energy storage systems due to their parasitic series resistance. These additional loses increase the system loses and can shorten the lifetime of energy storage devices.

The ripple current can be reduced to a desired level by increasing the value of the inductor L and/or increasing the switching frequency of the semiconductor devices used in the energy storage system. Unfortunately, increasing the inductance increases the size, weight and cost of the power converter in the energy storage system, as well as possibly increasing the losses within inductors in the system. Increasing the switching frequency will proportionally increase the switching losses, as well as reduce the life of the semiconductor devices.

SUMMARY OF THE INVENTION

In one embodiment, a capacitor-based energy storage system is provided. The system includes a first energy storage device, a second energy storage device, and a bi-directional DC-DC converter connecting first energy storage device with second energy storage device. The converter includes an inductor, a first switch and a second diode connected to form a DC-DC boost converter, and a second switch and a first diode, the second switch and the first diode connected to form a DC-DC buck converter. The DC-DC buck converter is cross connected with the DC-DC boost converter. The system also includes a controller for controlling the first and second switches, wherein said controller forces on the second switch so as to have a duty cycle of D=1 when a voltage across the second energy storage device is within a voltage operating window.

In another embodiment, a UPS connectable to a load and connectable to a source of power is provided. The UPS includes an ultracapacitor bank, a second capacitor bank, and a bidirectional DC-DC converter connected to the ultracapacitor bank and the second capacitor bank. The converter includes switches S1 and S2 for causing the converter to operate in one of conventional boost mode and conventional buck mode as function of whether the switches S1 and S2 are activated or not activated. The UPS also includes a bidirectional inverter connected to the second capacitor bank and connected to the bidirectional DC-DC converter. In addition, the UPS includes a controller connected to the ultracapacitor bank, the second capacitor bank, the bidirectional DC-DC converter and the bidirectional inverter, wherein the controller provides control signals to the bidirectional DC-DC converter causing the converter to force on the switch S2 on for so long as voltage on the second capacitor bank remains above a first threshold, thereby causing the bidirectional DC-DC converter to operate in an alternate buck mode.

In yet another embodiment, a method of controlling a buck-boost DC-DC converter is provided. The DC-DC converter is connected to a DC bus, a source and a load and has a boost converter with a switch S1 and a buck converter with a switch S2. The method includes causing the switch S2 to turn on and operate at a duty cycle of 1 when voltage on the DC bus remains within a first operating window and operating the switches S1 and S2 when the voltage on the DC bus falls outside the operating window so that the switches S1 and S2 have a duty cycle of less than 1.

In still another embodiment, a method of managing the voltages of a first energy storage device and a second energy storage device is provided. The first energy storage device is connected to the second energy storage device through a pair of cross connected DC-DC converters including a first switch and a second switch. The method includes the steps of detecting a voltage on the second energy storage device, determining if voltage on the second energy storage device is within a voltage operating window, forcing the second switch to remain continuously on when the voltage on the second energy storage device is within the voltage operating window and delivering energy from the second energy storage device through the second switch to the first energy storage device.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
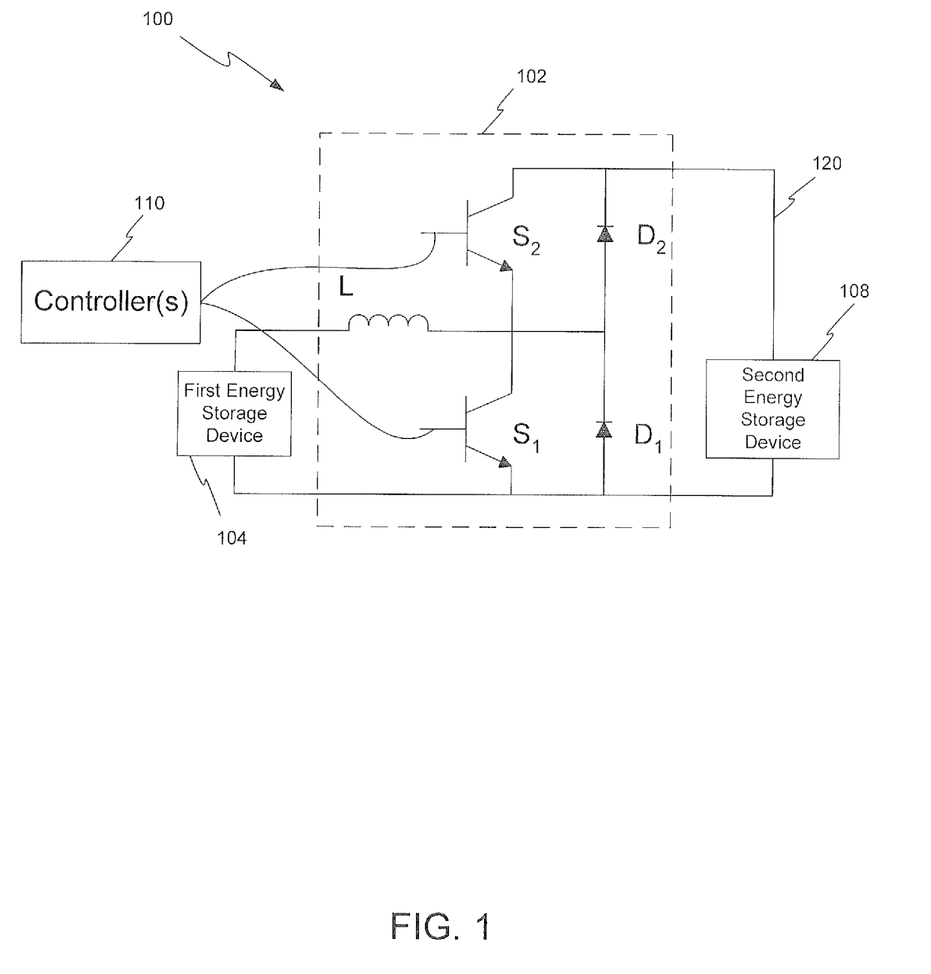
FIG. 1 is a circuit diagram of a DC-DC converter connected to first and second energy storage devices and a controller.

FIG. 1 illustrates one embodiment of an energy storage system 100 that provides low-loss control of a cross-connected DC-DC converter 102. In addition to converter 102, system 100 includes, among other things, a first energy storage device 104 (sometimes referred to as "first ESD") such as, but not limited to, one or more capacitors, ultracapacitors, or other capacitor-like energy storage devices, a second energy storage device 108 (sometimes referred to as "second ESD") such as, but not limited to, one or more electrolytic capacitors, polypropylene capacitors or other capacitor-like energy storage devices and a controller 110 for controlling the operation of DC-DC converter 102. In one implementation, first energy storage device 104 includes a bank of ultracapacitors and second energy storage device 108 includes a bank of electrolytic capacitors, with the banks including multiple strings of series-connected capacitor cells. Depending on the stored energy needed for the application, any number of strings of capacitor-like energy storage devices could be connected in parallel. In some implementations, it may be desirable to use batteries or other energy storage devices in first ESD 104 and/or second ESD 108.

In the embodiment shown in FIG. 1, DC-DC converter 102 is a conventional buck-boost, bi-directional DC-DC converter. DC-DC converter 102 includes a first switch S1 connected in parallel with a first diode D1, and a second switch S2 connected in parallel with a second diode D2. First switch S1, first diode D1, second switch S2, and second diode D2 are typically implemented using semiconductor devices. For example, first switch S1 and second switch S1 may include, among other devices, bipolar junction transistors, MOSFET, IGBT, GTO, IGCT, or similar semiconductor devices, as well as others known in the art.

DC-DC converter 102 also includes an inductor L connected between (i) first energy storage device 104 and (ii) switches S1 and S2 and diodes D1 and D2. As discussed more below, because of certain features of system 100 discussed more below, inductor L may be smaller than would typically be the case for a convention buck-boost DC-DC converter of the type illustrated in FIG. 1.

Energy storage system 100 also includes a controller 110. In this regard, reference to controller 110 is intended to cover a single controller or multiple controllers. Controller 110 is connected to switches S1 and S2 and provides control signals that turn the switches on and off, as described more below. Controller 110 may be any conventional DSP or other controller of the sort used to control the operation of DC-DC converters having one or more semiconductor switches.

First switch S1 and second diode D2 operate with inductor L to form a standard boost converter that allows energy stored in first energy storage device 104 to be delivered to second energy storage device 108. During conventional boost operation, controller 110 activates switch S1 and turns off switch S2. When activated, switch S1 is turned on, which places inductor L across first energy storage device 102, thereby transferring energy from the energy storage device to the inductor. When inductor L is charged, switch S1 is opened, which causes the inductor's current to flow through diode D2 and charge second ESD 108. Thus, in the active state, switch S1 is turned on until inductor L is charged, then it is turned off to allow energy to flow to second ESD 108, and then turned on again, then off, then on, and so on. Switch S1, under such conventional operation clearly has a duty cycle of less than 1, e.g., perhaps 0.5, although this value will typically change over time. Because the voltage across second ESD 108 is equal to the voltage across first ESD 104 plus the voltage on inductor L, the voltage across the second ESD will be larger than the voltage across the first ESD, thus realizing the voltage boost operation. Diode D2 will prevent reverse current, which would cause energy to flow from second ESD 108 to first ESD 104.

Second switch S2 and second diode D2 operate with inductor L to form a standard buck converter that allows first energy storage device 104 to be recharged by second energy storage device 108. During conventional buck operation, turning on switch S2 allows current to flow from first ESD 104 to second ESD 108, placing the voltage of the second ESD across the series combination of L and first ESD 104. When S2 opens, the current flowing in inductor L will turn on diode D1, placing zero volts across the series combination of inductor L and first ESD 104. Because, the average voltage across an inductor must be zero, the voltage across ESD 104 will be the duty-cycle of switch S2 times the voltage of second ESD 108, and in any event less than a duty cycle of one (D=1), thus realizing the conventional voltage buck operation.

During conventional switching operations of switches S1 and S2, when implemented using semiconductor devices, the non-instantaneous transitions of the voltage and current will result in switching losses. In addition, due to the switching nature of the buck and boost converters, the current flowing through inductor L (and consequently first ESD 104) will increase or decrease based on the present switching state of the semiconductor devices to form a ripple current. The ripple current introduces additional losses in first ESD 104 due to parasitic series resistance. Additional losses from the ripple current increases losses for system 100 and shortens the life of first ESD 104, particularly when implemented using ultracapacitors. These effects of the ripple current are highly undesirable.

Ripple current may conventionally be reduced to a selected level by increasing the value of inductor L and/or increasing switching frequency for switch S1 and switch S2. Increasing the inductance increases the size, weight, and cost of the system 110, as well as possibly increasing the losses within inductor L. Alternatively, increasing the switching frequency will proportionally increase the switching losses, as well as reducing the life of switches S1 and S2.

To address these and other problems, system 100 may be operated in an "alternate" buck mode. In this mode of operation, controller 110 forces switch S2 to remain on continuously so long as the voltage at second ESD 108 falls within an acceptable operating window. In other words, in the alternate buck mode, switch S2 has a duty cycle of one (D=1). The boundaries of the acceptable operating window will vary as a function of desired system functionality, specifications of the various components of system 100 and other factors. In many implementations, it will be desirable to select a lower end or floor (sometimes referred to as a first threshold) for the operating window that is about equal to the minimum target output voltage of the source, often the rated rectified voltage, (not shown in FIGS. 1 and 2) with which DC-DC converter 102 is connected. Under typical conditions, and in accordance with good engineering design practices, this lower end of the operating window will often be 80-90% of the target maximum voltage for ESD 108, although the lower end may be set substantially lower than 80% and still fall within the scope of the invention. The boundary of the upper end of the operating window is typically $V_{T2}$. Discussing further the upper end of the operating window, in some circumstances good engineering practices may dictate that $V_{T2}$ should be 95-98% of the target maximum voltage for second ESD 208, although it may be greater than 98% and still fall within the scope of the invention. In the alternate buck mode, first ESD 204 and second ESD 208 are effectively connected in parallel through switch S2 and diode D2.

Figure 2:
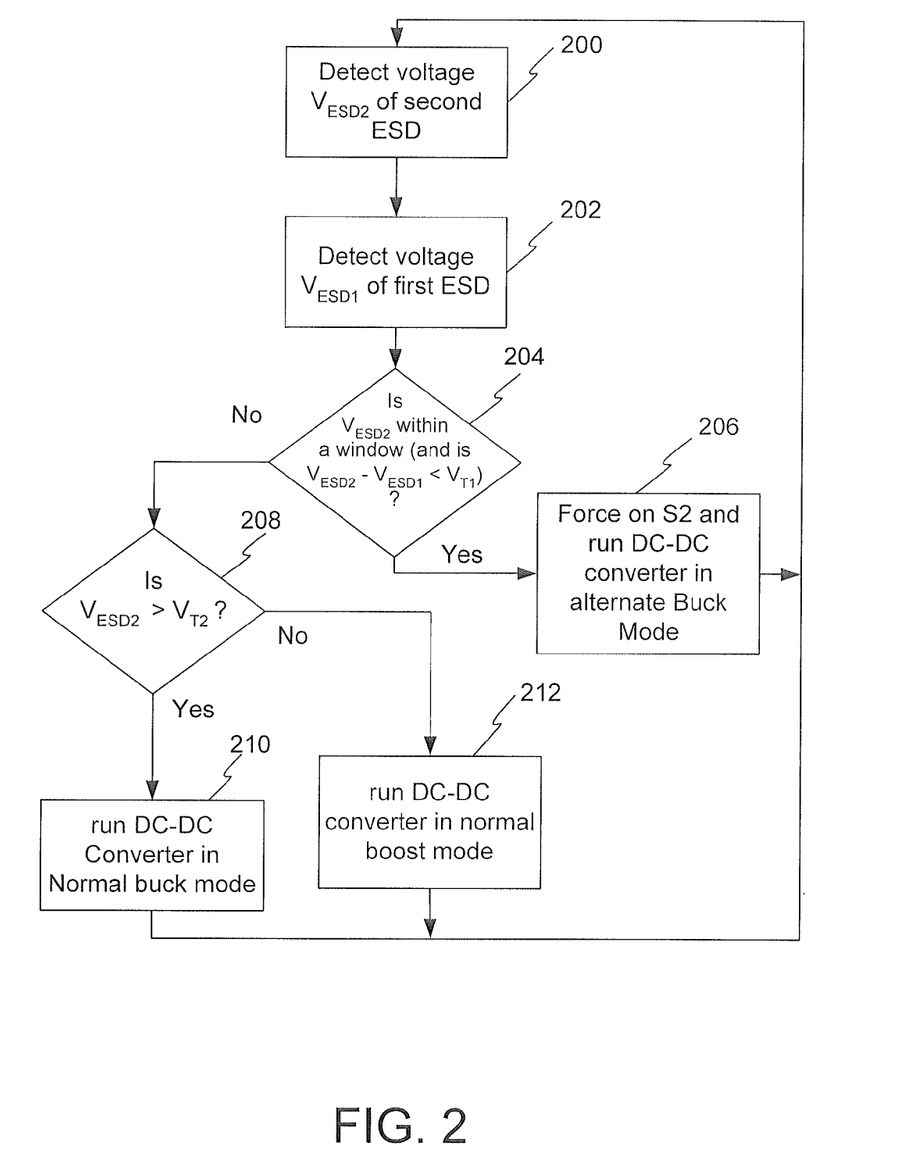
FIG. 2 is a flow diagram of steps performed by the controller connected to the DC-DC converter.

Turning now to FIGS. 1 and 2, the manner in which controller 110 may be used to control the operation of switch S2 so as to achieve the alternative buck mode operation will be discussed. The flow diagram of FIG. 2 just depicts a small portion of the logic used in controller 110 to control the operation of DC-DC converter 102, i.e., that portion directed to alternative buck mode operation. At step 200, the voltage on second ESD 108, $V_{ESD2}$, is detected. Next, at step 202, the voltage on first ESD 104, $V_{ESD1}$, is detected. As will be apparent based on the following description, in some cases step 202 may be omitted. Then, at step 204, a determination is made whether $V_{ESD2}$, is within the acceptable operating window. Optionally, as indicated parenthetically in step 204, a determination may also be made as whether or not the difference in voltages $V_{ESD1}$ and $V_{ESD2}$, (i.e., $V_{ESD2}-V_{ESD1}$) is less than a first threshold voltage, $V_{T1}$. If this latter step is not performed, step 202 will not necessarily be required. If $V_{ESD2}$ is within the operating window, then switch S2 is forced on continuously, as indicated in step 206, and DC-DC controller 102 is run in the alternate buck mode for so long as $V_{ESD2}$ remains within the operating window. In the event the optional step of determining whether $V_{ESD1}-V_{ESD2}<V_{ET1}$ is performed, then step 206 is implemented only when both conditions indicated in step 204 are satisfied.

In the event the condition(s) evaluated at step 204 are not satisfied, then the method proceeds to step 208. There, a determination is made as to whether or not $V_{ESD2}$ is greater than $V_{T2}$, as indicated by step 208. If so, then DC-DC converter 102 is run in the normal buck mode, as described above, and as illustrated by step 210. If not, then DC-DC converter 102 is run in the normal boost mode, as indicated by step 212. After each of steps 206, 210 and 212, the process followed by controller 110 involves returning to step 200.

Figure 3:
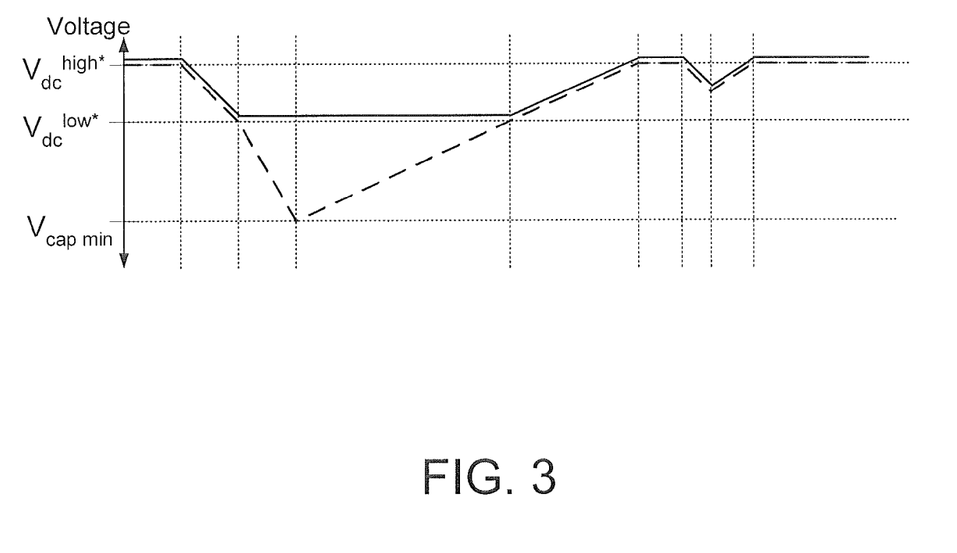
FIG. 3 is a voltage versus time graph depicting changes of voltages on the first and second energy storage devices during operation of the DC-DC converter.

Operation of system 100 may also be understood with reference to the voltage trajectories illustrated in FIG. 3. In this figure, the trajectories for two discharge/charge cycles are illustrated. Operation of system 100 starts with first ESD 104 being fully charged and with the voltages on the first ESD and second ESD 108 being equal to $V_{dc}^{high*}$. At this start of operation, DC-DC converter 102 is continuously forced on, i.e., it is latched into the D=1 state. At time $t_1$, power is drawn from second ESD 108, and so voltages correspondingly decrease. At time $t_2$, the voltage on second ESD 108 has reached $V_{dc}^{low*}$ and now DC-DC converter 102 is able to start regulating the second ESD by discharging first ESD 104. At time $t_3$, the demand on second ESD 108 for power ends and second ESD 108 attempts to return to $V_{dc}^{high*}$. This causes a slight increase in the voltage on second ESD 108, thereby causing DC-DC converter 102 to re-charge first ESD 104. At time $t_4$, the voltage on first ESD 104 is equal to the voltage on second ESD 108 and DC-DC converter 102 looses its ability to regulate the voltage on second ESD 108. Therefore, voltage increases on both first ESD 104 and second ESD 108 until they reach $V_{dc}^{high*}$ at time $t_5$. This completes the first cycle. Operation in the alternate buck mode occurs between times $t_0$ and $t_2$ and after time $t_4$.

The second cycle is shorter in duration (or smaller in power level) and therefore DC-DC converter 102 does not become active, i.e., it remains in the alternate buck mode throughout the entire second cycle. Delivery of power from a DC source or a grid side converter (neither shown) starts at time $t_6$. At time $t_7$, the DC source or grid side converter stops supplying average power. At time $t_8$, the dc bus is fully recharged. This second cycle demonstrates the benefit of the present approach for controlling the operation of DC-DC controller 102. By forcing switch S2 on throughout the entire second cycle, switching losses are minimized, if not avoided, as discussed more below.

Employing the alternate buck mode of operation greatly reduces the duty cycle for the ripple current in first ESD 104 and consequently, for a given lifetime of the first ESD, increases the amount of acceptable ripple current. Because the inductance L is sized based on the value of acceptable ripple current, an increased acceptable ripple current will allow for a reduced value of L. This results in a smaller, lighter and lower cost DC-DC converter 102.

Furthermore, because the DC-DC converter 102 is not switching, except for the few seconds of operation during a power quality event, its efficiency is greatly increased because the only converter losses are conduction losses. These losses are a strong function of the current and because the current will be small (primarily leakage current from first ESD 104), the conduction losses will be small as well.

In the foregoing discussion of energy storage system 100, reference has been made to minimum voltage on second ESD 108 in connection with defining the bounds of the operating window used by controller 110 in forcing switch S2 to be continuously on so as to cause DC-DC converter 102 to operate in the alternate buck mode. It is to be appreciated that the invention can be generalized such that minimum voltage on a DC bus 120 (FIG. 1) may be used in defining the bounds of the operating window used by controller 110.

Figure 4:
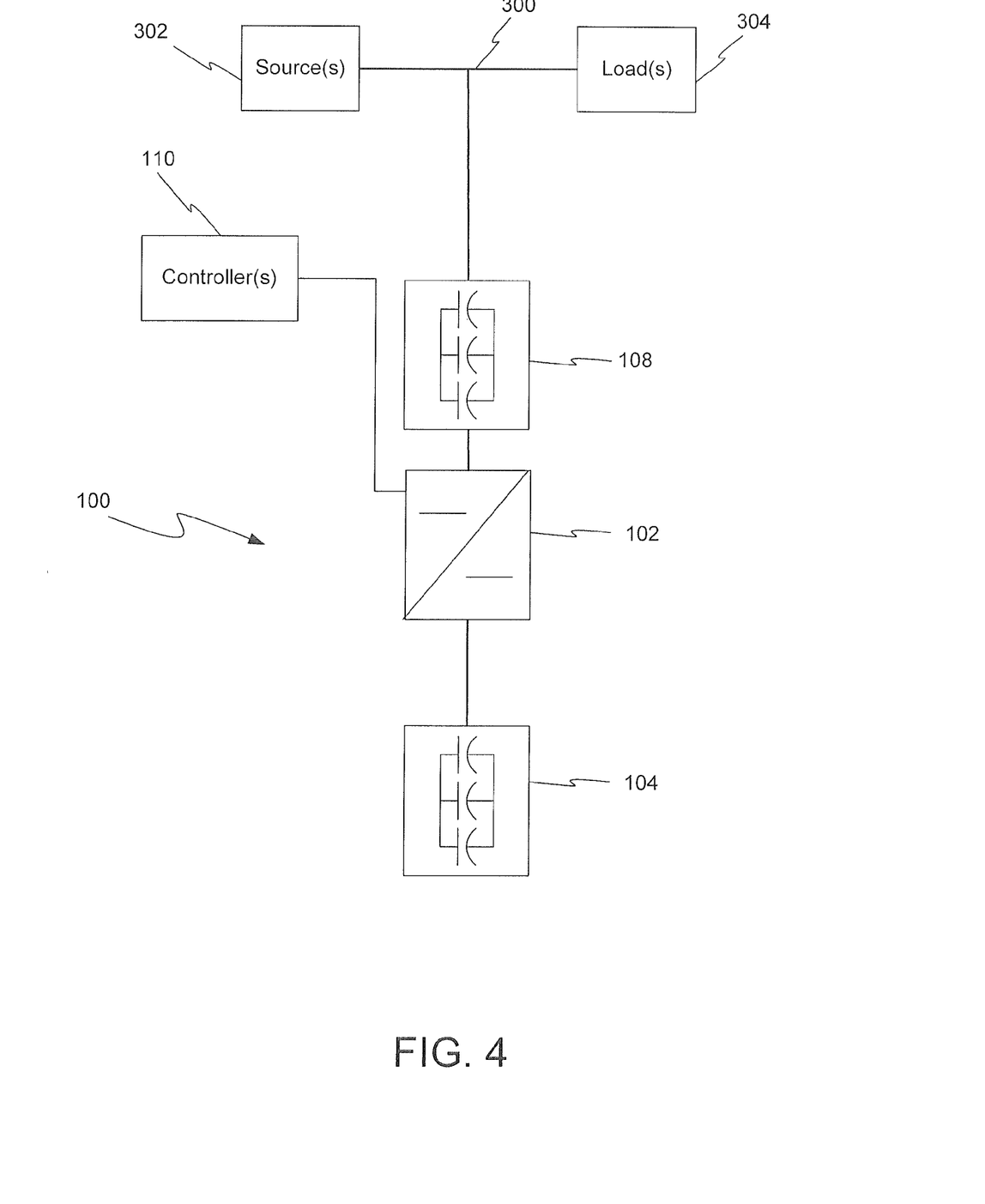
FIG. 4 is a schematic diagram illustrating one system in which the DC-DC converter may be used.

Turning next to FIGS. 1 and 4, energy storage system 100 may be used in a variety of contexts. As indicated in FIG. 4, second ESD 108 of system 100 may be connected to a variable load DC bus 300, which in turn is connected to one or more sources 302 and one or more loads 304. As discussed generally above, the floor of the operating window used by controller 110 in determining when to force switch S2 continuously on may, if desired, be defined with respect to the minimum target output voltage of source 302.

One example of an implementation for the system of FIG. 4 would be a 48Vdc (nominal) power distribution system such as is commonly used by telecommunications equipment. In this implementation, source(s) 302 could be 48Vdc power supplies and load(s) 304 could be loads that have some means of internal power conditioning such that some degree of variation on the input voltage is acceptable. DC-DC converter 102 and first ESD 104 will act as an energy storage system for second ESD 108. If the voltage from source 302 decreases (e.g., a loss of power input to the source(s), failure of the source(s) or source overload with current foldback or similar protection), then DC-DC converter 102 can return/maintain the 48V distribution bus to be within a nominal window. When source(s) 302 return and 48V bus 300 increases to the regular voltage level, DC-DC converter 102 will recharge first ESD 104 in accordance with the alternate buck mode described above.

Figure 5:
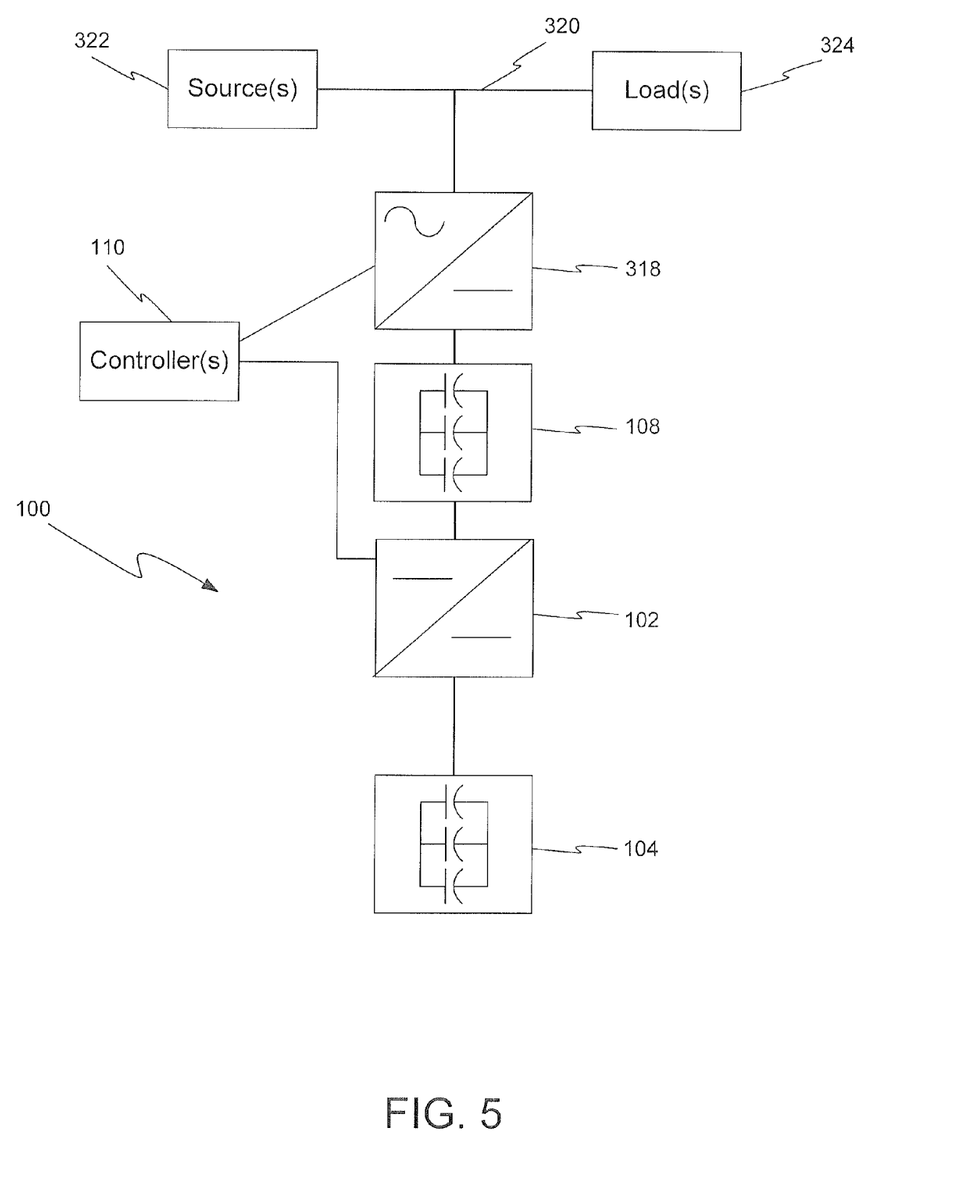
FIG. 5 is a schematic diagram illustrating a second system in which the DC-DC converter may be used.

Referring next to FIGS. 1 and 5, energy storage system 100 may also be connected to a bidirectional inverter 318, which in turn is connected to an AC bus 320. More particularly, inverter 318 is connected in series with second ESD 108 and bus 320. The latter is also connected to source 322 and load 324. Controller 110, or other controllers (not shown), may be connected to inverter 318 to control its operation. Here too, the floor of the operating window used by controller 110 in determining when to force switch S2 continuously on may, if desired, be defined with respect to the minimum target output voltage of source 322.

In the exemplary implementation shown in FIG. 5, DC-DC converter 102 is used to convert the voltage from first ESD 104 to the voltage required by inverter 318 (e.g., ~840 volts).

In this implementation, DC-DC converter 102 must have a sufficiently fast response time to provide rated power to inverter 318 for large-signal power quality events. DC-DC converter 102, as discussed above, also operates in the alternate buck mode to recharge first ESD 104, as needed.

Inverter 318 converts the DC power from first ESD 104 by way of DC-DC converter 102 to AC power for loads 324. The function of inverter 318 is to supply whatever current is needed to keep the voltage at load(s) 324 within the desired power quality limits. Inverter 318 may also provide a seamless transition between grid-connected and stand-alone operation.

Figure 6:
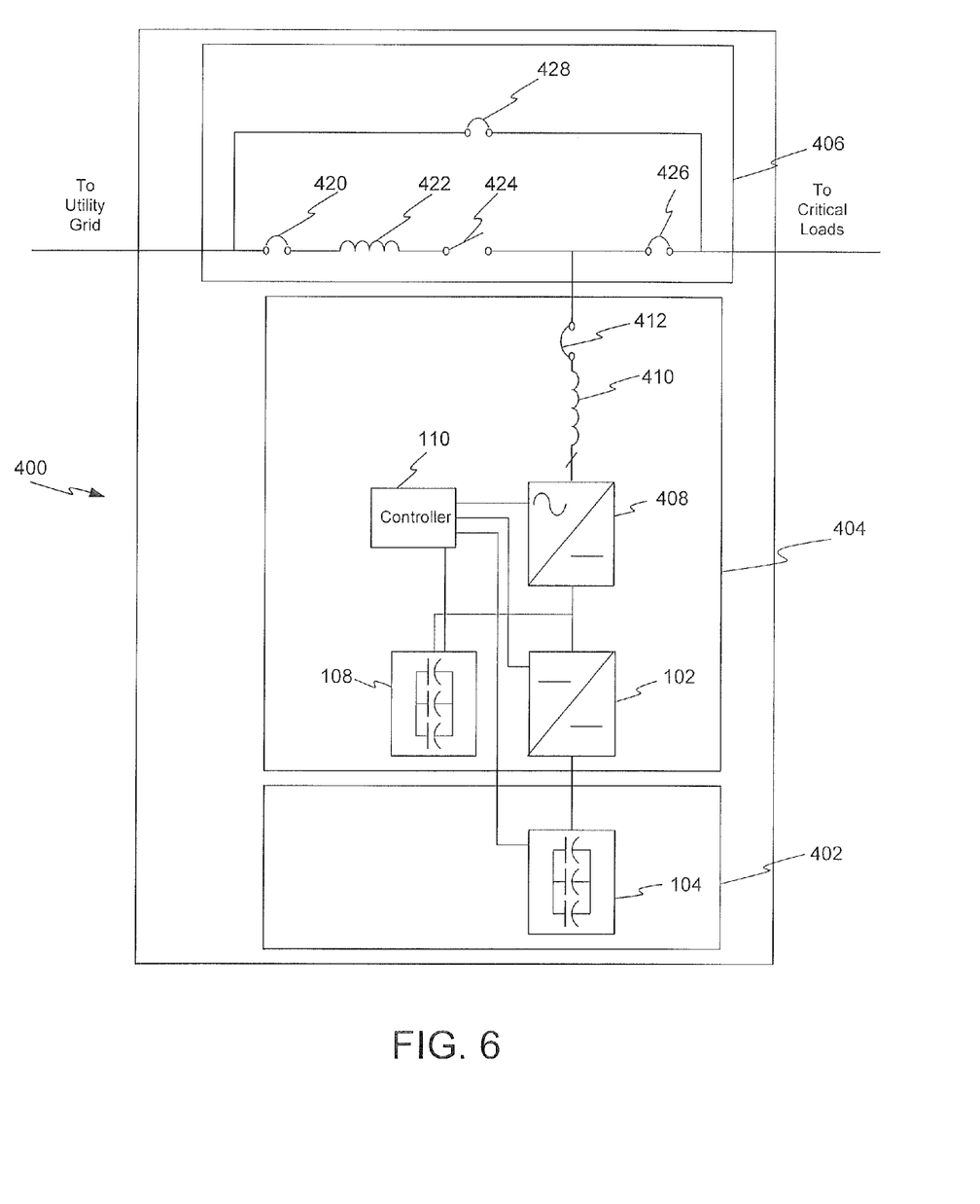
FIG. 6 is a schematic diagram of a portion of an uninterruptible power supply in which the DC-DC converter may be used.

Turning now to FIGS. 1 and 6, in yet another exemplary implementation, energy storage system 100 may be used in an uninterruptible power supply ("UPS") 400. UPS 400 may include an energy storage subsystem 402, a shunt power conversion subsystem 404 and a series component subsystem 406. Energy storage subsystem 402 may include first ESD 104. UPS 400 is often operated with an alternate power supply (not shown) during the brief period of time between when the power source, typically a utility grid, with which the UPS is connected goes down or suffers a power quality event, and when the alternate power supply begins delivering power.

Shunt power conversion subsystem 404 may include DC-DC converter 102, second ESD 108, and controller 110, all connected as described above with respect to energy storage system 100. Controller is also connected to and controls first ESD 104. Shunt power subsystem 404 also includes a bidirectional inverter 408 connected to DC-DC converter 102 and controller 110. Bidirectional inverter 408 is serially connected to series component subsystem 406 via inductor 410 and isolation breaker 412.

Series component subsystem 406 is connected between a source, typically a utility grid, and a load, typically a critical load. Series component subsystem 406 may include an isolation breaker 420, an inductor 422, a fast switch 424 and an isolation breaker 426, all connected in series between the source and the load. Shunt power conversion subsystem 404 is connection to this collection of series-connected components. Optionally, series component subsystem 406 may include a bypass breaker 428 connected in parallel with components 420, 422, 424 and 426.

In the operation of UPS 400, DC-DC converter 102 will typically operate in the alternate buck mode with a minimal power flow sufficient to overcome the self-discharge of first ESD 104 in order to maintain the desired voltage on the first ESD. Under normal operation, the bidirectional inverter 408, i.e., the grid interfacing inverter, will only supply reactive power and so voltages on first ESD 104 and second ESD 108 will remain relatively constant. When a grid event occurs and UPS 400 needs to supply real power, DC-DC converter 102 will operate in the boost mode and regulate voltage on second ESD 108 while discharging first ESD 104. Once either the grid returns or the alternate source is powering the load, DC-DC converter 102 will operate in the alternate buck mode to re-charge first ESD 104, and maintain the first ESD in a charged state. Proportionally, the charging/discharging operations will represent a very small fraction of the operational time of UPS 400 since acceptable grid power (or power from another source) is likely to be available the majority of time, even in poor supply locations and these operations will only occur during the transitions between the grid and alternate supplies.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A capacitor-based energy storage system comprising:
   a first energy storage device;
   a second energy storage device; and
   a bi-directional DC-DC converter connecting said first energy storage device with said second energy storage device, said converter including:
      an inductor, a first switch and a second diode connected to form a DC-DC boost converter;
      a second switch and a first diode, said inductor, said second switch and said first diode connected to form a DC-DC buck converter, wherein said DC-DC buck converter is cross connected with said DC-DC boost converter; and
      a controller controlling said first and second switches, wherein said controller forces on said second switch so as to have a duty cycle of D=1 when a voltage across said second energy storage device is within a voltage operating window.

2. A system according to claim 1, wherein said first and second energy storage devices each include at least one capacitor or capacitor-like energy storage device.

3. A system according to claim 1, wherein said controller controls said first and second switches so that said DC-DC boost converter and said DC-DC buck converter operate in accordance with conventional modes of operation until such time as voltage across said second energy storage device falls within said voltage operating window.

4. A system according to claim 1, wherein said second energy storage device has a maximum voltage level and said voltage operating window has a floor equal to 80-98% of said maximum voltage level.

5. A system according to claim 1, wherein said system is connectable to a source having a minimum target output voltage, further wherein said voltage operating window has a floor substantially equal to the minimum target output voltage of the source.

6. A system according to claim 1, wherein said first energy storage device includes a bank of ultracapacitors.

7. A system according to claim 1, wherein said second energy storage device includes a bank of electrolytic capacitors.

8. A system according to claim 1, wherein said first and second DC-DC converters include multi-phase converters.

9. A system according to claim 1, wherein said first and second switches include metal-oxide-semiconductor field-effect transistors (MOSFETs).

10. A system according to claim 1, wherein said first and second switches include insulated gate bipolar transistors (IGBTs).

11. A system according to claim 1, further including a bidirectional inverter connected between said second energy storage device and a source and a load.

12. A UPS connectable to a load and connectable to a source of power, the UPS comprising:
   a. an ultracapacitor bank;
   b. a second capacitor bank;
   c. a bidirectional DC-DC converter connected to said ultracapacitor bank and said second capacitor bank, wherein said converter includes switches S1 and S2 for causing said converter to operate in one of conventional boost mode and conventional buck mode as function of whether said switches Si and S2 are activated or not activated;

d. a bidirectional inverter connected to said second capacitor bank and connected to said bidirectional DC-DC converter; and e. a controller connected to said ultracapacitor bank, said second capacitor bank, said bidirectional DC-DC converter and said bidirectional inverter, wherein said controller provides control signals to said bidirectional DC-DC converter causing said converter to force on said switch S2 on for so long as voltage on said second capacitor bank remains above a first threshold, thereby causing said bidirectional DC-DC converter to operate in an alternate buck mode.

13. A UPS according to claim 12, wherein the source has a minimum target voltage output and said first threshold is substantially equal to the minimum target voltage output.

14. A UPS according to claim 12, wherein said second capacitor bank has a maximum voltage level and said first threshold is equal to 80-98% of said maximum voltage level.

15. A method of controlling a buck-boost DC-DC converter connected to a DC bus, a source and a load and having a boost converter with a switch S1 and a buck converter with a switch S2, the method comprising:

a. causing the switch S2 to turn on and operate at a duty cycle of 1 when voltage on the DC bus remains within a first operating window; and b. operating the switches S1 and S2 when the voltage on the DC bus falls outside the operating window so that the switches S1 and S2 have a duty cycle of less than 1.

16. A method according to claim 15, wherein the source has a minimum target output voltage and the operating window has a floor voltage that is substantially equal to said minimum target output voltage.

17. A method of managing the voltages of a first energy storage device and a second energy storage device, the first energy storage device connected to the second energy storage device through a pair of cross connected DC-DC converters including a first switch and a second switch, the method comprising the steps of:

detecting a voltage on the second energy storage device;

determining if voltage on the second energy storage device is within a voltage operating window;

forcing the second switch to remain continuously on when the voltage on the second energy storage device is within the voltage operating window; and delivering energy from the second energy storage device through the second switch to the first energy storage device.

18. A method according to claim 17, further comprising determining whether the difference between voltage on said first energy storage device and voltage on said second energy storage device is less than a first voltage threshold, and if so, and if said voltage on said second energy storage device is within the voltage operating window, turning on said second switch S2 and operating said second switch at a duty cycle of D=1.

* * * * *

UNITED STATES PATENT AND TRADEMARK OFFICE
CERTIFICATE OF CORRECTION

PATENT NO. : 7,990,117 B2
APPLICATION NO. : 12/168355
DATED : August 2, 2011
INVENTOR(S) : Eric L. Benedict It is certified that error appears in the above-identified patent and that said Letters Patent is hereby corrected as shown below:

In column 8, claim 12, line 66, delete "Si" and insert --S1-- therefor.

Signed and Sealed this
Eighth Day of November, 2011

David J. Kappos
*Director of the United States Patent and Trademark Office*